(12) United States Patent  
Watanabe (10) Patent No.: US 8,483,920 B2  
(45) Date of Patent: Jul. 9, 2013

(54) SHIFT CONTROL DEVICE FOR AUTOMATIC TRANSMISSION

(75) Inventor: Nobuyuki Watanabe, Wako (JP)

(73) Assignee: Honda Motor Co., Ltd, Tokyo (JP)

( * ) Notice: Subject to any disclaimer, the term of this patent is extended or adjusted under 35 U.S.C. 154(b) by 1392 days.

(21) Appl. No.: 11/874,380

(22) Filed: Oct. 18, 2007

(65) Prior Publication Data

US 2008/0096720 A1    Apr. 24, 2008

(30) Foreign Application Priority Data

Oct. 19, 2006   (JP) ................................. 2006-285164

(51) Int. Cl.
*G06F 7/00* (2006.01)

(52) U.S. Cl.
USPC .............................................. 701/68; 477/76

(58) Field of Classification Search
USPC ................. 701/51, 58, 60, 62, 65, 66, 67, 68,
701/57; 477/34, 70, 76, 79, 80, 97, 98, 174,
477/77
See application file for complete search history.

(56) References Cited

U.S. PATENT DOCUMENTS

| | | | | |
|---|---|---|---|---|
| 4,733,581 A * | 3/1988 | Hasegawa et al. | ............... | 477/98 |
| 4,800,781 A * | 1/1989 | Yasue et al. | ...................... | 477/98 |
| 5,029,492 A * | 7/1991 | Kiuchi | ............................. | 477/98 |
| 5,050,717 A * | 9/1991 | Shibayama | ...................... | 477/64 |
| 5,337,630 A * | 8/1994 | Sakai et al. | ...................... | 701/57 |
| 5,505,100 A * | 4/1996 | Mitchell et al. | ................. | 74/335 |
| 5,601,511 A * | 2/1997 | Michioka | ......................... | 477/98 |
| 5,839,084 A * | 11/1998 | Takasaki et al. | ................ | 701/67 |
| 6,019,703 A * | 2/2000 | Black et al. | .................... | 477/168 |
| 6,078,856 A * | 6/2000 | Malson | ............................. | 701/57 |
| 6,095,946 A * | 8/2000 | Maguire et al. | .................. | 477/98 |
| 6,128,565 A * | 10/2000 | Tsutsui et al. | ................... | 701/51 |
| 6,157,883 A * | 12/2000 | Popp et al. | ...................... | 701/51 |
| 6,223,842 B1 * | 5/2001 | Masaki | ...................... | 180/65.23 |
| 6,318,486 B2 * | 11/2001 | Masaki | ...................... | 180/65.23 |
| 6,468,182 B1 * | 10/2002 | Brandt et al. | .................... | 477/98 |
| 6,637,565 B2 * | 10/2003 | Kwon | .......................... | 192/3.29 |
| 6,645,121 B2 * | 11/2003 | Wu et al. | .......................... | 477/98 |
| 6,729,987 B2 * | 5/2004 | Sakamoto et al. | ............ | 475/117 |
| 6,835,164 B2 * | 12/2004 | Habeck | .......................... | 477/132 |
| 6,915,681 B2 * | 7/2005 | Kaigawa et al. | ........... | 73/114.68 |
| 7,043,347 B2 * | 5/2006 | Inoue et al. | ...................... | 701/67 |
| 7,048,672 B2 * | 5/2006 | Bothe et al. | .................... | 477/110 |
| 7,121,976 B2 * | 10/2006 | Sakamoto et al. | ............... | 477/98 |
| 7,470,212 B2 * | 12/2008 | Inagaki et al. | ................ | 477/111 |
| 2003/0213296 A1 * | 11/2003 | Kaigawa et al. | ............. | 73/118.1 |

(Continued)

FOREIGN PATENT DOCUMENTS

JP        10-169483 A       6/1998
JP        2005-98431 A      4/2005

*Primary Examiner* — Thomas Black
*Assistant Examiner* — Sze-Hon Kong
(74) *Attorney, Agent, or Firm* — Westerman, Hattori, Daniels & Adrian, LLP (57) ABSTRACT

A shift control device for an automatic transmission having a plurality of frictional engaging elements adapted to be selectively engaged to perform shift control. The shift control device includes a computing unit for computing the temperature of at least one of the frictional engaging elements to be engaged in shifting, a comparing unit for comparing the temperature computed by the computing unit with a reference temperature, and an upshift delaying unit for delaying the timing of upshift using the frictional engaging element to be engaged by a predetermined time period when the temperature computed by the computing unit is higher than the reference temperature.

7 Claims, 11 Drawing Sheets

U.S. PATENT DOCUMENTS

| | | | |
|---|---|---|---|
| 2005/0283298 A1* | 12/2005 | Ochi et al. | 701/67 |
| 2006/0040790 A1* | 2/2006 | Tohta et al. | 477/98 |
| 2006/0046896 A1* | 3/2006 | Nakajima et al. | 477/107 |
| 2006/0058937 A1* | 3/2006 | Takebayashi et al. | 701/51 |
| 2006/0079373 A1* | 4/2006 | Nishio et al. | 477/97 |
| 2006/0194672 A1* | 8/2006 | Ochi et al. | 477/76 |

* cited by examiner

SHIFT CONTROL DEVICE FOR AUTOMATIC TRANSMISSION

BACKGROUND OF THE INVENTION

1. Field of the Invention

The present invention relates to a shift control device for an automatic transmission including frictional engaging elements such as shifting clutches for switching among power transmission paths composed of a plurality of shift gear trains to automatically perform shifting.

2. Description of the Related Art

Conventionally widely used is an automatic transmission in a vehicle such that frictional engaging elements such as shifting clutches are selectively engaged to thereby switch among power transmission paths composed of a plurality of shift gear trains, thus automatically performing shifting. In recent years, there is a trend that a shifting time of an automatic transmission (an engaging operation time of each frictional engaging element) has been increased for the purposes of higher power of an engine and improvement in shift quality of the automatic transmission, for example. In association with this trend, the amount of heat generated from the frictional engaging element subjected to shifting tends to increase in the automatic transmission.

In this case, the frictional engaging element heated to high temperatures in the shift operation is cooled by heat exchange or the like with a hydraulic fluid or automatic transmission fluid (ATF) for the automatic transmission, so that the temperature of the frictional engaging element lowers to a temperature substantially equal to the temperature of the ATF. Accordingly, suppression of a rise in temperature of the ATF is an important factor in protecting the facing of each frictional engaging element from thermal damage such as burning. For example, Japanese Patent Laid-open No. Hei 10-169483 discloses a technique of detecting the temperature of the ATF and continuously reducing the output torque from an engine when the ATF temperature detected above is greater than or equal to a predetermined temperature.

However, until the heat generated from each frictional engaging element is absorbed to the ATF by heat exchange to cool each frictional engaging element, a predetermined radiation time is required for the ATF and there remains a given difference in temperature between each frictional engaging element and the ATF until the radiation from the ATF is completed. Accordingly, in the case of simply suppressing a rise in temperature of the ATF as by the technique disclosed in Japanese Patent Laid-open No. Hei 10-169483 mentioned above, the measures against thermal damage to each frictional engaging element may be insufficient in some case. In such a particular case that the vehicle runs on a winding road, shift control may be repeatedly performed and the same frictional engaging element may be frequently engaged in a short period of time. In this case, there is a possibility that a large amount of heat may be stored in the same frictional engaging element even when the ATF temperature is low, causing thermal damage such as burning to the facing.

A shift control device for an automatic transmission which can solve this problem is proposed in Japanese Patent Laid-open No. 2005-98431, wherein frequently performed shift control can be supported to protect each frictional engaging element from thermal damage. The shift control device disclosed in this publication performs control so that when the amount of heat stored in each frictional engaging element exceeds an allowable value, the shift timing is changed to an earlier-than-usual timing to thereby reduce differential rotation of the disks, thereby suppressing the amount of heat generated to protect each frictional engaging element from thermal damage. In the shift control device disclosed in Japanese Patent Laid-open No. 2005-98431 mentioned above, the upshift timing is set to an earlier-than-usual timing, causing a problem such that a drive force desired by an operator cannot be sufficiently transmitted. Further, in particular shifting with a large amount of heat generated, such as shifting with partial return of an accelerator pedal, an enough satisfactory effect cannot be obtained.

SUMMARY OF THE INVENTION

It is therefore an object of the present invention to provide a shift control device for an automatic transmission which can provide a sufficient drive force desired by the operator and can prevent the failure due to thermal damage to the frictional engaging element.

In accordance with an aspect of the present invention, there is provided a shift control device for an automatic transmission having a plurality of frictional engaging elements adapted to be selectively engaged to perform shift control, said shift control device including computing means for computing the temperature of at least one of said frictional engaging elements to be engaged in shifting; comparing means for comparing the temperature computed by said computing means with a reference temperature; and upshift delaying means for delaying the timing of upshift using said frictional engaging element to be engaged by a predetermined time period when the temperature computed by said computing means is higher than said reference temperature.

With this arrangement, a sufficient drive force can be ensured and each frictional engaging element can be protected from thermal damage.

Preferably, said upshift delaying means sets said predetermined time period so that the higher the temperature of said frictional engaging element to be engaged, the longer said predetermined time period.

Preferably, said shift control device further includes delay canceling means for canceling the delay of the upshift timing by said predetermined time period by said upshift delaying means when the rotational speed of an engine becomes a set value or higher.

Thus, when the rotational speed of the engine becomes a set value or higher, the delay of the upshift timing by the predetermined time period by the upshift delaying means is canceled by the delay canceling means to allow upshift, so that over-revolution of the engine can be prevented.

The above and other objects, features and advantages of the present invention and the manner of realizing them will become more apparent, and the invention itself will best be understood from a study of the following description and appended claims with reference to the attached drawings showing some preferred embodiments of the invention.

DETAILED DESCRIPTION OF THE PREFERRED EMBODIMENTS

Figure 1:
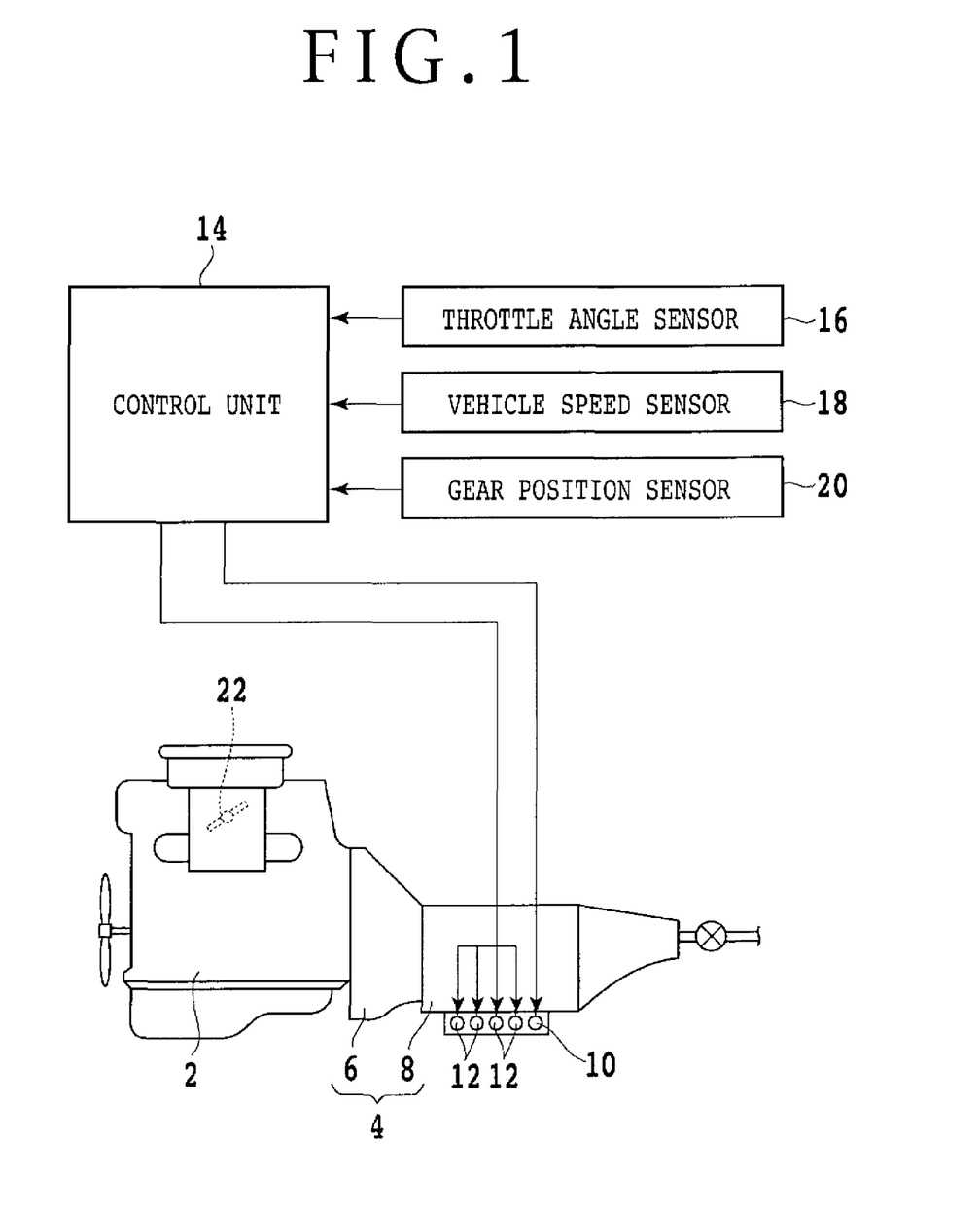
FIG. 1 is a schematic diagram showing a general configuration of a shift control device according to a preferred embodiment of the present invention.

A preferred embodiment of the present invention will now be described in detail with reference to the attached drawings. FIG. 1 is a schematic diagram showing a general configuration of a shift control device according to a preferred embodiment of the present invention. In FIG. 1, reference numerals 2 and 4 denote an engine and an automatic transmission, respectively. An output from the engine 2 is transmitted through the automatic transmission 4 to drive wheels (not shown). The automatic transmission 4 is composed of a torque converter 6 and a multispeed change gear drive 8. The torque converter 6 is provided with a lockup clutch (not shown). The lockup clutch is engaged or disengaged by controlling a solenoid 10 for lockup.

The multispeed change gear drive 8 has five gear positions for forward running, and as well known in the art a desired one of these gear positions can be set by changing the combination of energization and de-energization of a plurality of solenoids 12 for gear shift as shift operating means. Each of these solenoids 10 and 12 functions to switch the operational modes of a hydraulic actuator or hydraulic frictional engaging element for lockup or gear shift. Reference numeral 14 denotes a control unit (ECU) using a microcomputer, and signals from a throttle angle sensor 16, a vehicle speed sensor 18, and a gear position sensor 20 are input into the control unit 14.

The throttle angle sensor 16 functions to detect an opening angle of a throttle valve 22, i.e., a throttle angle. The vehicle speed sensor 18 functions to detect a present vehicle speed, and the gear position sensor 20 functions to detect a present gear position in the automatic transmission 4, that is, to detect a gear shift. The control unit 14 outputs an on/off control signal to the solenoid 10 for the lockup clutch and a shift control signal to each solenoid 12. The control unit 14 basically includes a CPU, ROM, RAM, and clock (soft timer), and further includes an A/D converter or D/A converter and an input/output interface. Such a configuration is well known in the case of using a microcomputer, so the description thereof will be omitted herein.

Figure 2:
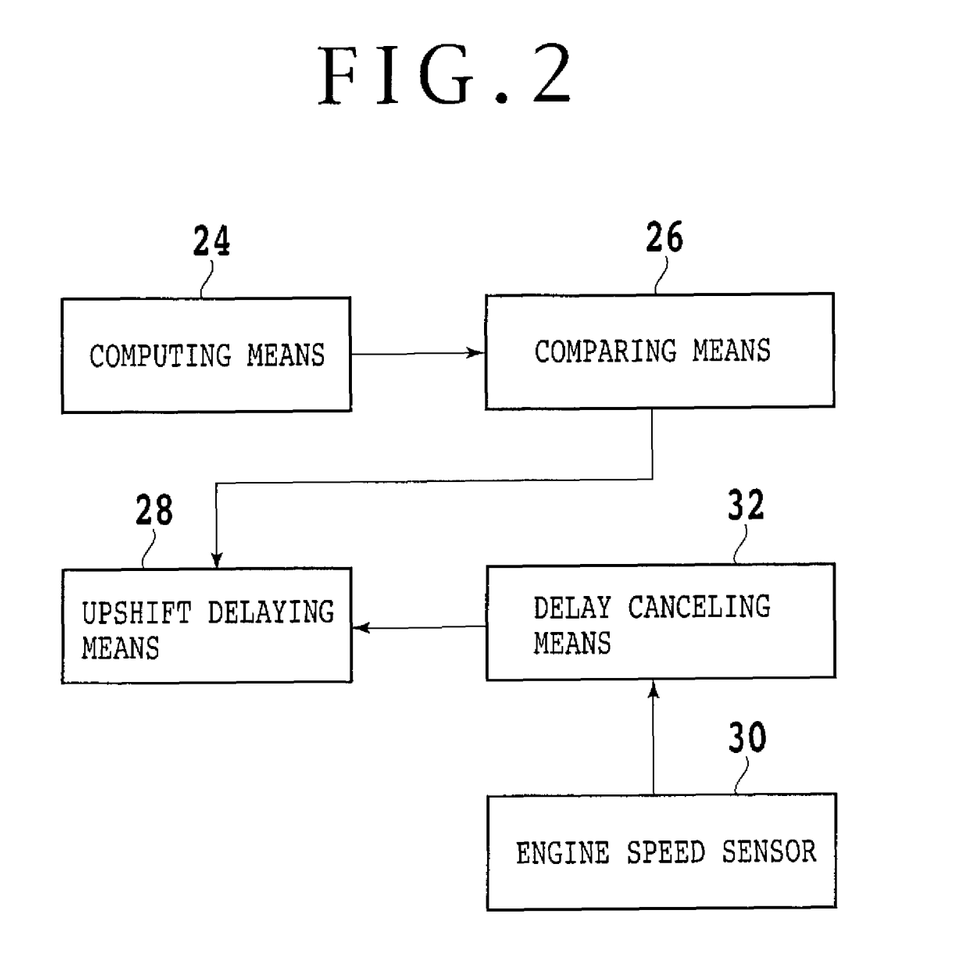
FIG. 2 is a block diagram showing the principle of the present invention.

FIG. 2 is a block diagram showing the principle of the present invention. Computing means 24 computes the temperature of at least a frictional engaging element to be engaged in shifting. Comparing means 26 compares the temperature computed by the computing means 24 with a reference temperature. Upshift delaying means 28 delays the timing of upshift using the frictional engaging element to be engaged by a predetermined time period when the temperature computed by the computing means 24 is higher than the reference temperature. Preferably, the upshift delaying means 28 sets the above predetermined time period so that the higher the temperature of the frictional engaging element to be engaged, the longer the predetermined time period.

An output from an engine speed sensor 30 is input into delay canceling means 32. The delay canceling means 32 cancels the delay of the above upshift timing by the predetermined time period by the upshift delaying means 28 when the rotational speed of the engine becomes a set value or higher. According to the present invention, a sufficient drive force desired by the operator can be provided and the failure due to thermal damage to the frictional engaging element can be prevented. Further, over-revolution of the engine can be prevented by the delay canceling means 32 capable of canceling the delay of the upshift timing by the predetermined time period by the upshift delaying means 28.

Figure 3:
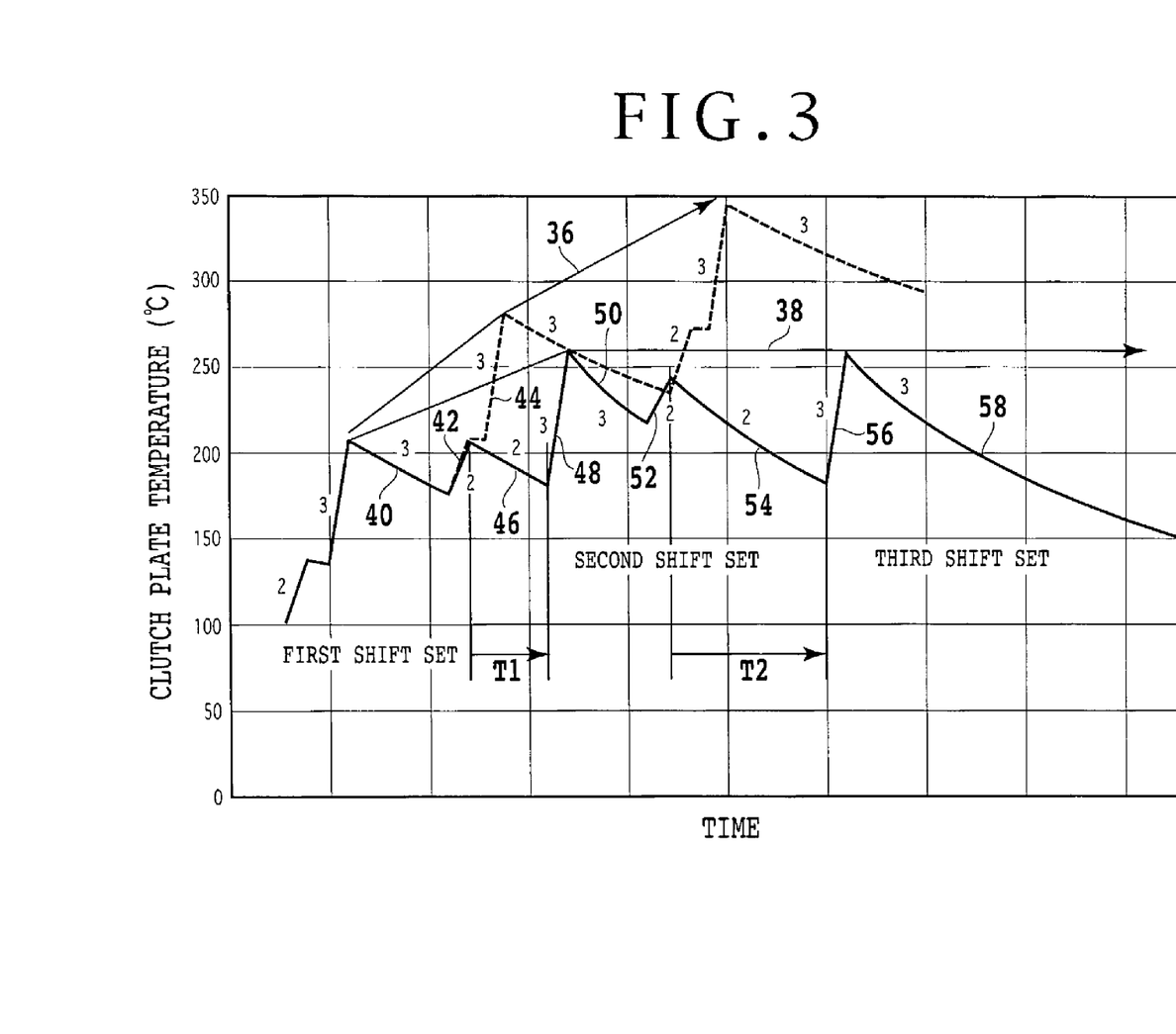
FIG. 3 is a graph showing a shift control image according to the present invention.

A general outline of the shift control according to the present invention will now be described with reference to FIG. 3 showing a control image diagram. The control image diagram shows the temperature of a third clutch in continuous shifting of 3-2 downshift and 2-3 upshift. In FIG. 3, the broken line shows the temperature of the third clutch in the case that the control of the present invention is not performed, and the solid line shows the temperature of the third clutch in the case that the control of the present invention is performed. The numeral "2" or "3" shows the engaged condition of a second clutch or third clutch, respectively.

First, 2-3 upshift is performed to cause a rise in temperature of the third clutch. After a predetermined time period, the third clutch is cooled, so that the temperature of the third clutch lowers as shown by reference numeral 40. Next, 3-2 downshift is performed to cause a rise in temperature of the third clutch as shown by reference numeral 42. In the conventional control, 2-3 upshift is next performed immediately to cause a further rise in temperature of the third clutch as shown by reference numeral 44. To the contrary, in the shift control of the present invention, shift restriction for a time period T1 just after the above 3-2 downshift is effected to inhibit 2-3 upshift and to accordingly hold the second gear position, so that the temperature of the third clutch lowers as shown by reference numeral 46. After the elapse of the reference time period T1, 2-3 upshift is allowed to engage the third clutch, causing a rise in temperature of the third clutch as shown by reference numeral 48.

After a predetermined time period, the temperature of the third clutch lowers as shown by reference numeral 50. Next, 3-2 downshift is performed again to cause a rise in temperature of the third clutch as shown by reference numeral 52. After the 3-2 downshift, shift restriction for a time period T2 is effected to inhibit 2-3 upshift and to accordingly hold the second gear position, so that the temperature of the third clutch lowers as shown by reference numeral 54. After the elapse of the restriction time period T2, 2-3 upshift is allowed to engage the third clutch, causing a rise in temperature of the third clutch as shown by reference numeral 56. After a predetermined time period, the third clutch is cooled, so that the temperature of the third clutch gradually lowers as shown by reference numeral 58.

In the conventional control, the temperature of the third clutch rises as shown by a line 36. To the contrary, in the control of the present invention, the ATF temperature is peaked out at a certain value as shown by a line 38 by setting a proper delay time period for the upshift timing. Thus, by delaying the timing of upshift generating a large amount of heat from a clutch, the amount of heat from the clutch can be suppressed more reliably, thereby protecting the clutch from thermal damage.

Figure 4:
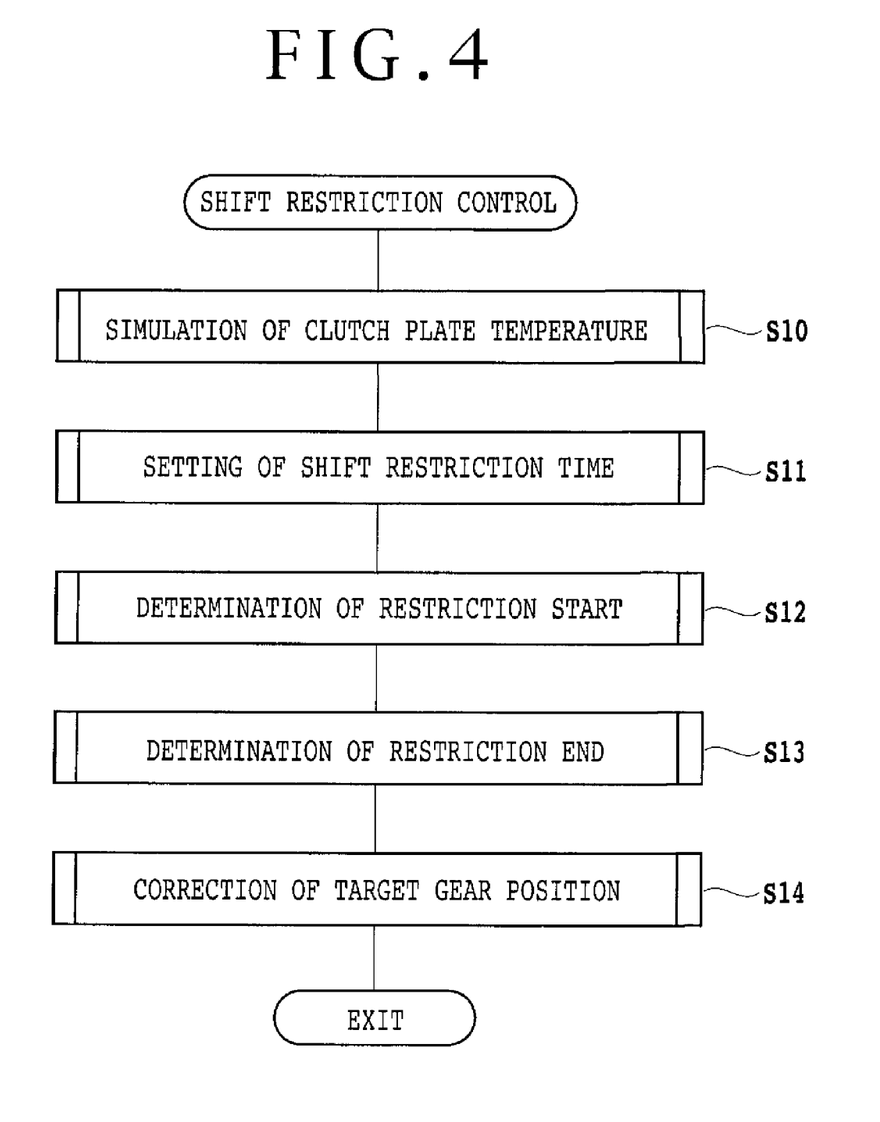
FIG. 4 is a flowchart showing a general flow of shift restriction control according to the present invention.

The flow of processing of the shift control device for the automatic transmission according to the preferred embodiment will now be described with reference to the flowcharts shown in FIGS. 4, 5, 7, and 9 to 11. FIG. 4 is a main flowchart showing a general flow of processing. In step S10, the temperature of each clutch plate is simulated. In other words, the amount of heat from each clutch (frictional engaging element) during shifting is calculated from controlled torque of the clutch and differential rotation of the clutch to thereby estimate the temperature of each clutch plate.

Figure 5:
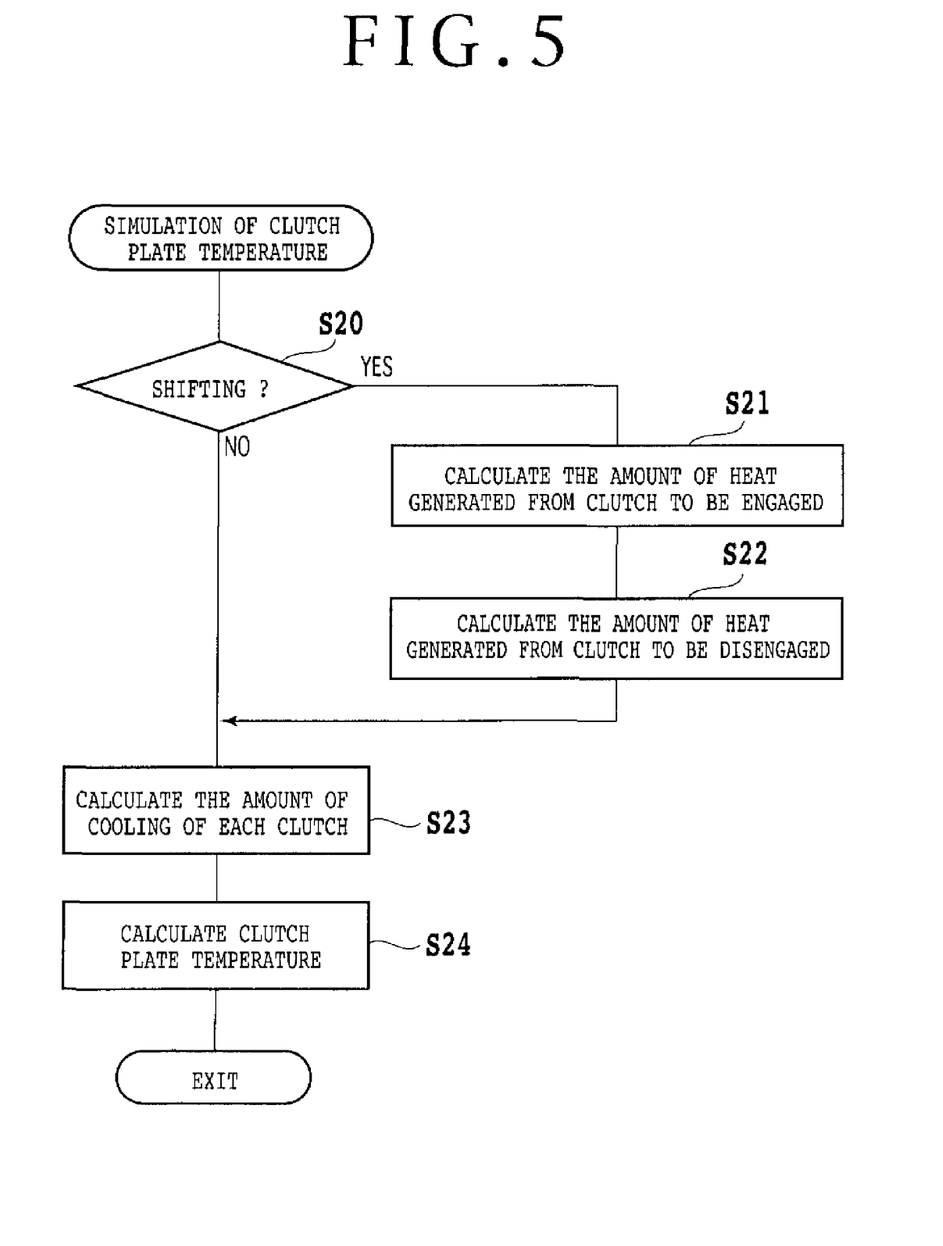
FIG. 5 is a flowchart showing the processing of calculation of the temperature of each clutch plate.
Figure 6:
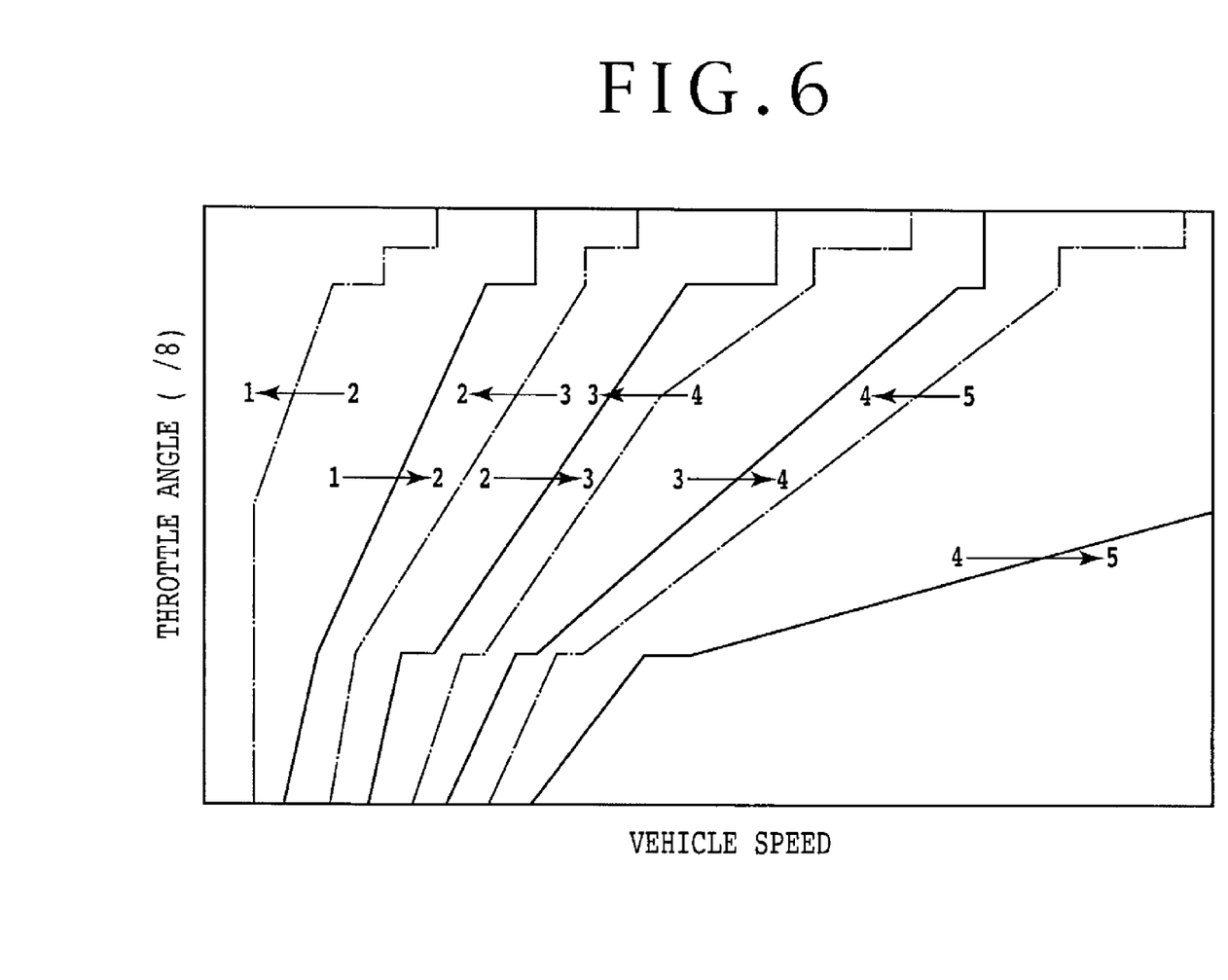
FIG. 6 is a graph showing a shift map.

The processing of step S10 is specifically shown in the flowchart of FIG. 5. In step S20 it is determined whether or not shifting is being performed at present. This shifting is performed according to the shift map as a function of throttle angle and vehicle speed as shown in FIG. 6. In FIG. 6, the solid lines show upshift characteristic lines, and the dot & dash lines show downshift characteristic lines. If the answer in step S20 is affirmative, the program proceeds to step S21 to calculate the amount of heat generated from the clutch to be engaged. Further, in step S22, the amount of heat generated from the clutch to be disengaged is calculated.

The heat quantity ΔQ generated per unit time is given by $$\Delta Q = (\text{engaged clutch torque}) \times d\omega/dt \quad (1)$$

where $$(\text{engaged clutch torque}) = (a+b-c) \times myu \times KDISK \quad (2)$$

where a is the force applied to a piston by hydraulic pressure, b is the centrifugal hydraulic pressure to NMW, c is the return spring load, myu is the dynamic μ value, and KDISK is the disk coefficient [=(gear ratio)×(the number of disks)].

Accordingly, the heat quantity Q(t) at time t is given by $$Q(t) = \sum_{t=0} \Delta Q(t) \quad (3)$$

If the answer in step S20 is negative or after the calculation in step S22 is performed, the program proceeds to step S23 to calculate the amount of cooling of each clutch, i.e., the amount of heat to be absorbed by the oil, Qout, which is given by $$Q\text{out} = \beta(Tb - TLUB) \quad (4)$$

where $$TLUB = TATF \quad (5)$$

where Tb is the virtual clutch plate temperature obtained by calculation, TLUB is the virtual ATF temperature obtained by calculation, TATF is the drain oil temperature of ATF, and β is the coefficient changing according to the rotational speed of an input shaft of the automatic transmission, wherein this coefficient is tuned so that each clutch plate can be cooled during a suitable time period.

Next, the program proceeds to step S24 to calculate the temperature of each clutch plate.

The clutch plate temperature T(t) is calculated from Eq. (3) by the following equation.

$$T(t) = \frac{\sum_{i=0} \Delta Q(t)}{Cp \cdot m} \quad (6)$$

where Cp is the specific heat of each clutch plate and m is the weight of each clutch plate. Accordingly, in step S24, the temperature of each clutch plate is calculated from the heat capacity of each clutch plate.

After ending the processing of step S10 shown in FIG. 4, the program proceeds to step S11 to set the shift restriction time period. In step S11, the time period (delay time period) for restriction of upshifting in each clutch is set from the clutch plate temperature just after ending of shifting. The processing of step S11 is specifically shown in the flowchart of FIG. 7. In step S30, it is determined whether or not shifting has just been ended. If the answer in step S30 is affirmative, the program proceeds to step S31 to refer to the map shown in FIG. 8 and to retrieve a restriction time period, then setting the restriction time period thus retrieved. The restriction time period is set by the timer, which is set for each clutch.

Figure 8:
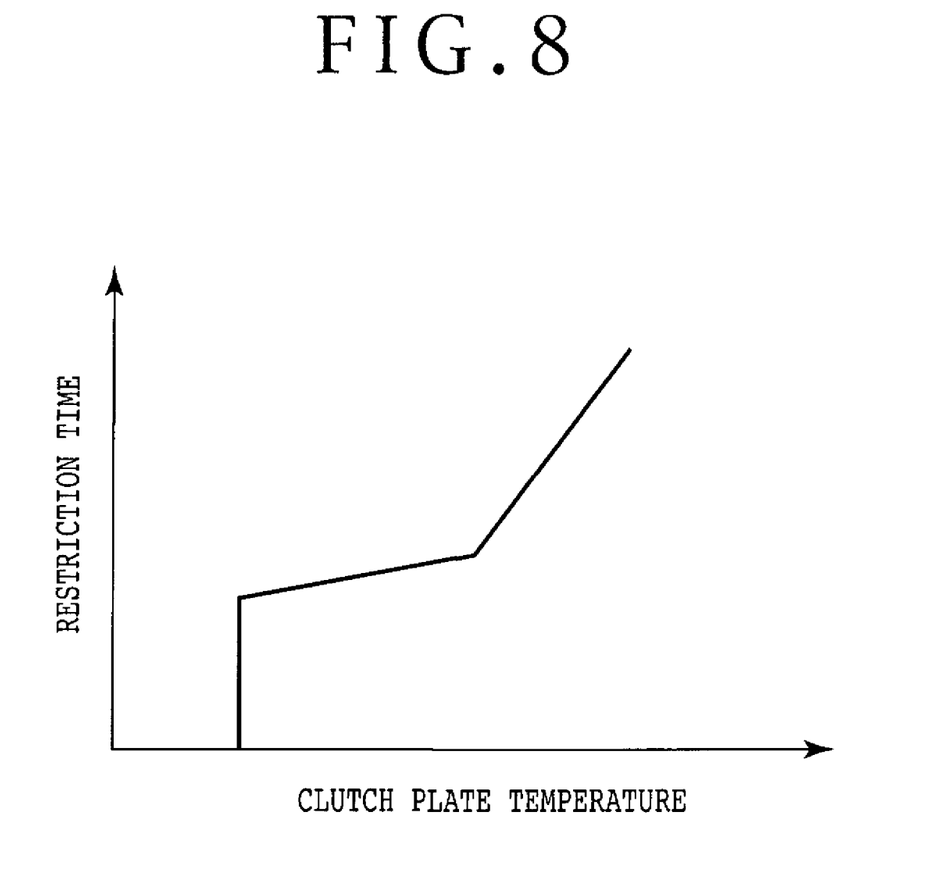
FIG. 8 is a map showing the relation between clutch plate temperature and shift restriction time.

More specifically, in each clutch (the clutch to be engaged and the clutch to be disengaged) that has worked in shifting, a restriction time period corresponding to the clutch plate temperature calculated by simulation is retrieved by referring to the map of FIG. 8, and the restriction time period thus retrieved is set as the upshift delay time period for each clutch that has worked in shifting. As apparent from FIG. 8, it is preferable that the higher the clutch plate temperature, the longer the restriction time period. Accordingly, the clutch to be engaged in upshifting can be sufficiently protected from thermal damage.

After ending the processing of step S11 shown in FIG. 4, the program proceeds to step S12 to determine whether or not the upshift restriction is to be started. That is, the determination of starting of the upshift restriction is performed to set a restriction flag indicating the restriction of upshift to a target gear position. The processing of step S12 is specifically shown in the flowchart of FIG. 9. In step S40, it is determined whether or not this determination processing is the first cycle of processing after decision of a target gear position. In other words, this restriction start determination processing is performed at only the first cycle after decision of a target gear position.

Figure 9:
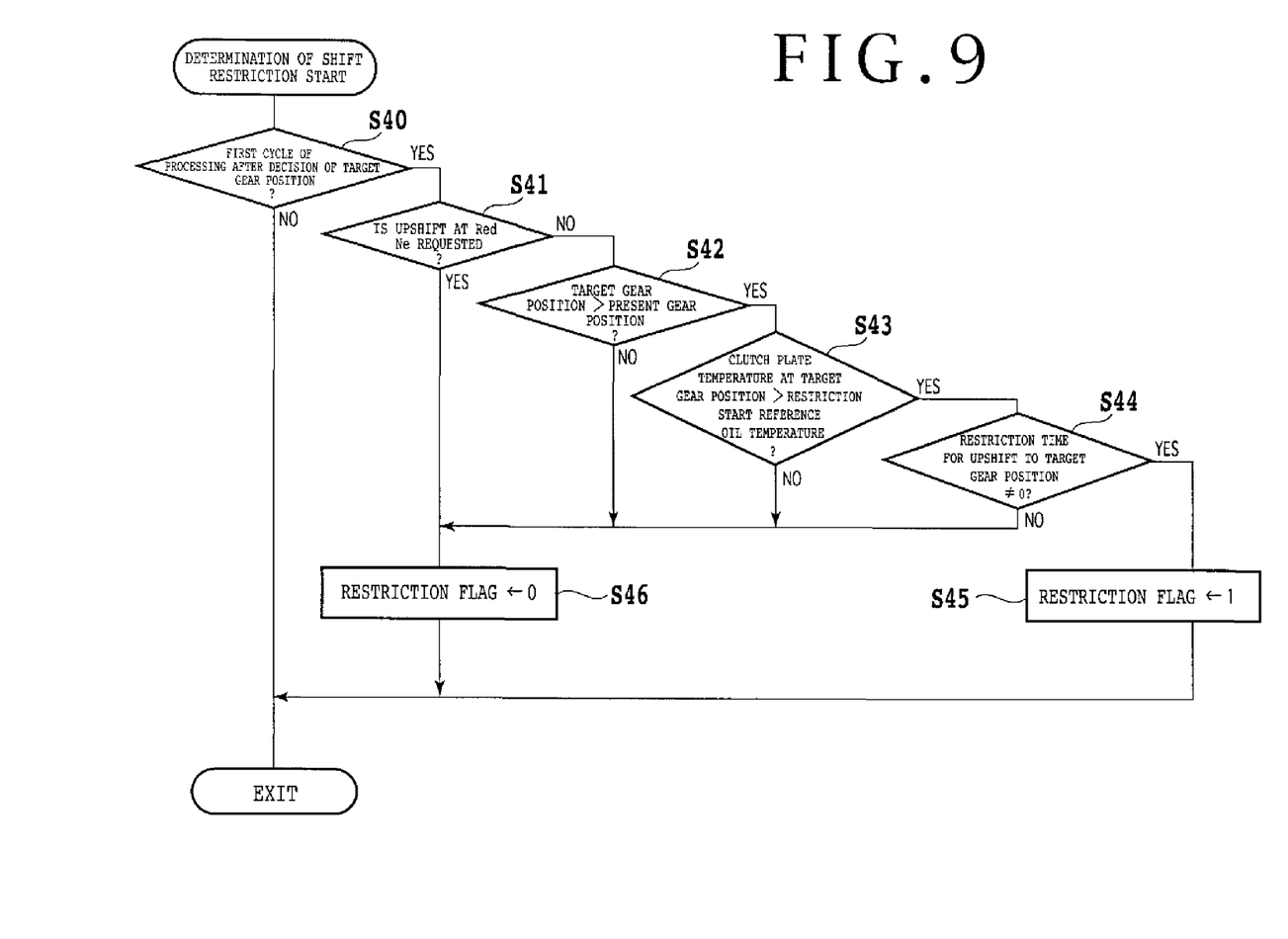
FIG. 9 is a flowchart showing the processing of determination of shift restriction start.

If the answer in step S40 is affirmative, the program proceeds to step S41 to determine whether or not the prevention of engine over-revolution is required. If the answer in step S41 is affirmative, i.e., if the engine speed is in an upper limit region (Red Ne), upshift is allowed. Conversely, if the answer in step S41 is negative, the program proceeds to step S42 to determine whether or not the target gear position is higher than the present gear position, i.e., to determine whether or not upshift is to be performed. If the answer in step S42 is affirmative, the program proceeds to step S43 to determine whether or not the clutch plate temperature at the target gear position is higher than a restriction start reference oil temperature, or a restriction start reference clutch plate temperature. This restriction start reference clutch plate temperature is set for each gear position.

Figure 7:
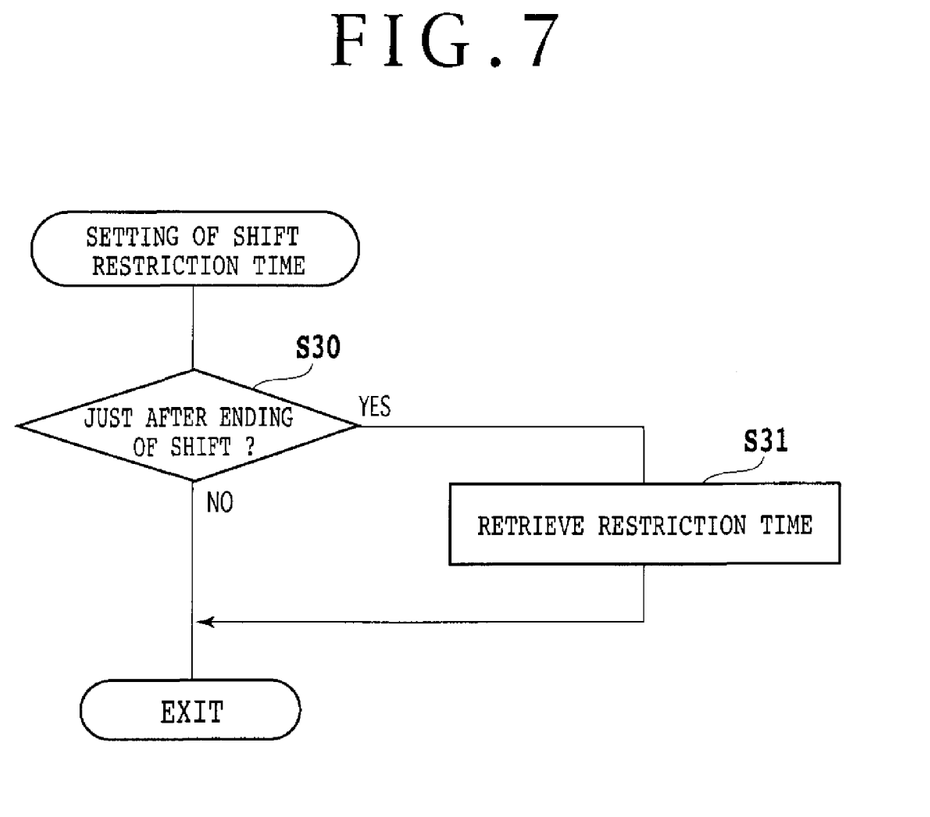
FIG. 7 is a flowchart showing the processing of setting of a shift restriction time period.

If the answer in step S43 is affirmative, the program proceeds to step S44 to determine whether or not the timer set in step S31 shown in FIG. 7 is being counted. If the answer in step S44 is affirmative, the program proceeds to step S45 to set an upshift inhibition flag. Conversely, if the answer in step S41 is affirmative or if the answer in step S42, S43, or S44 is negative, the program proceeds to step S46 to reset (clear) the upshift inhibition flag, thus allowing the upshift to the target gear position.

After ending the processing of step S12 shown in FIG. 4, the program proceeds to step S13 to determine whether or not the upshift restriction is to be ended. That is, the determination of ending of the upshift restriction is performed to clear the restriction flag (upshift inhibition flag) indicating the restriction of upshift to the target gear position. The processing of step S13 is specifically shown in the flowchart of FIG. 10. In step S50, it is determined whether or not the clutch plate temperature at the target gear position is lower than the restriction start reference oil temperature. If the answer in step S50 is affirmative, the program proceeds to step S51 to clear the restriction flag (upshift inhibition flag).

Figure 10:
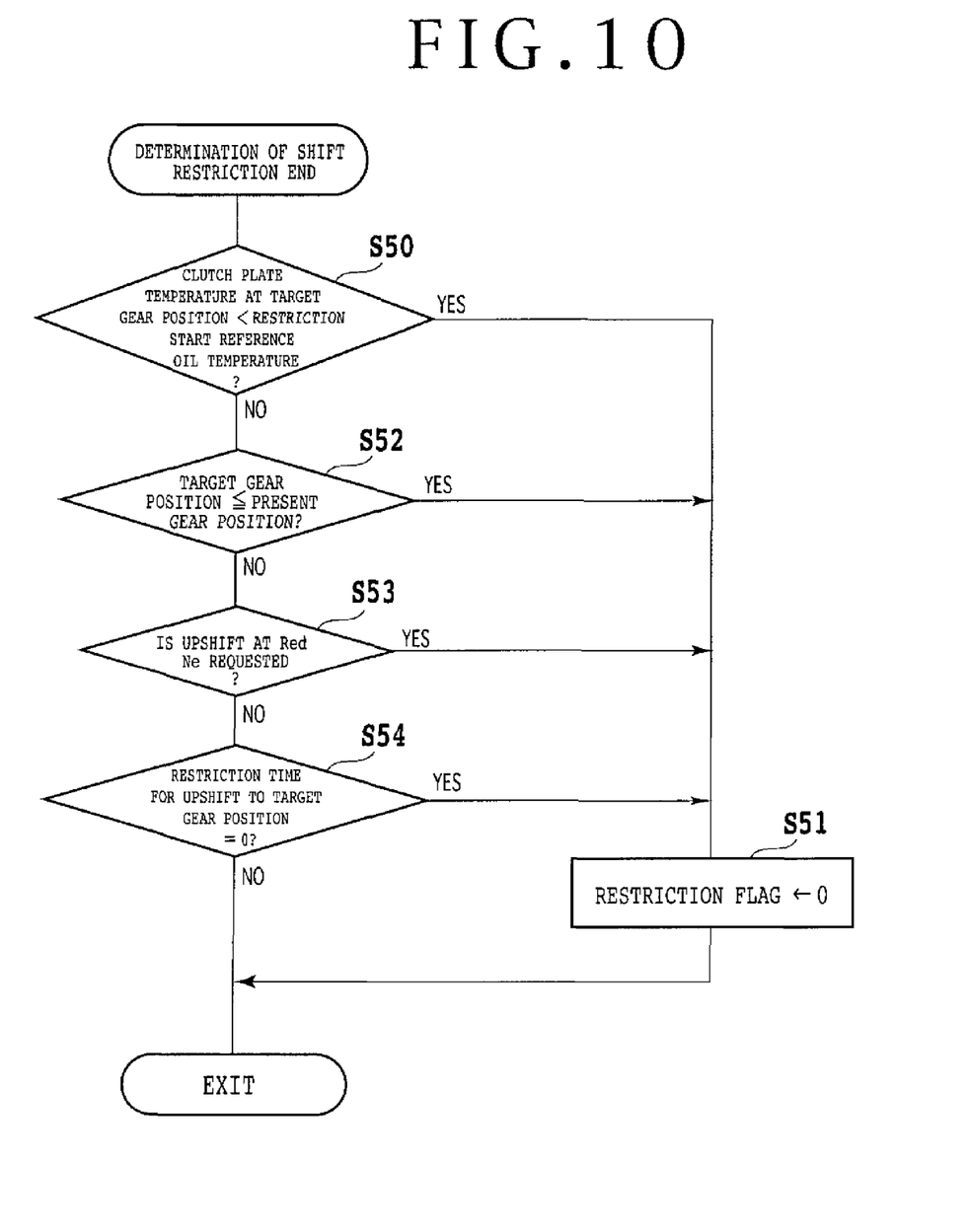
FIG. 10 is a flowchart showing the processing of determination of shift restriction end.
Figure 11:
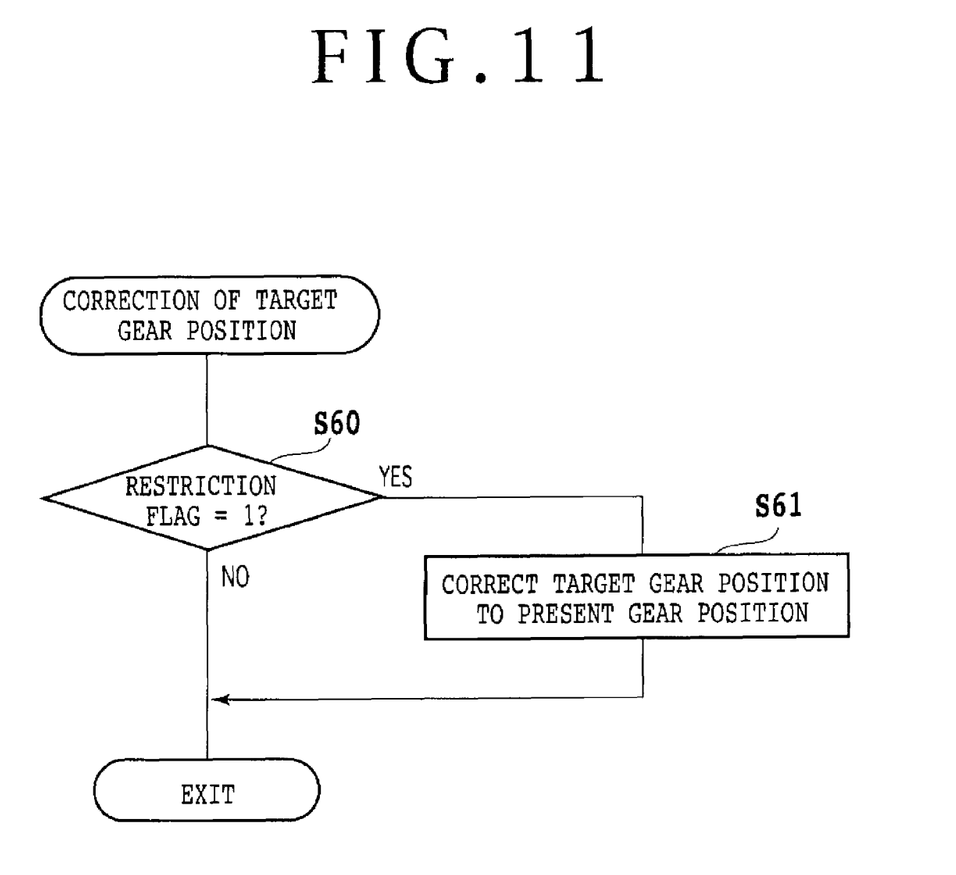
FIG. 11 is a flowchart showing the processing of correction of a target gear position.

If the answer in step S50 is negative, the program proceeds to step S52 to determine whether or not the target gear position is equal to or less than the present gear position. If the answer in step S52 is affirmative, i.e., if shifting is not requested or if downshift is requested, the program proceeds to step S51 to clear the restriction flag. That is, when the request for upshift is removed and the request for downshift is made, the downshift is allowed. If the answer in step S52 is negative, the program proceeds to step S53 to determine whether or not upshift is requested according to the prevention of engine over-revolution. In other words, if upshift in the upper limit region (Red Ne) of the engine speed is requested, the upshift is allowed. That is, if the answer in step S53 is affirmative, the program proceeds to step S51 to clear the restriction flag.

If the answer in step S53 is negative, the program proceeds to step S54 to determine whether or not the restriction time period to the target gear position has become zero, i.e., to determine whether or not the upshift restriction timer set has been counted up. If the upshift restriction time period has elapsed, upshift is allowed. That is, if the answer in step S54 is affirmative, the program proceeds to step S51 to clear the restriction flag.

After ending the processing of step S13 shown in FIG. 4, the program proceeds to step S14 to correct the target gear position. In this processing, the target gear position is corrected so as to restrict the upshift from the present gear position. The processing of step S14 is specifically shown in the flowchart of FIG. 11. In step S60, it is determined whether or not the restriction flag is set. If the answer in step S60 is affirmative, the program proceeds to step S61 to correct the target gear position to the present gear position.

Thus, the upshift causing a large amount of heat generated from the clutch is delayed to thereby disengage the clutch in which the clutch plate temperature has raised, so that the temperature of the clutch can be lowered. Further, by holding the present gear position or allowing downshift, the drivability can be ensured. While the temperatures of all the clutches are calculated in shifting in the above preferred embodiment, the present invention is not limited to this configuration, but the temperature of only the clutch to be engaged in shifting may be calculated.

The present invention is not limited to the details of the above described preferred embodiments. The scope of the invention is defined by the appended claims and all changes and modifications as fall within the equivalence of the scope of the claims are therefore to be embraced by the invention.

What is claimed is:

1. A shift control device for an automatic transmission having a plurality of frictional engaging elements adapted to be selectively engaged to perform shift control, said shift control device comprising:
   computing means for computing the temperature of at least one of said frictional engaging elements to be engaged in shifting;
   comparing means for comparing the temperature computed by said computing means with a reference temperature;
   means for comparing a target gear position with a current gear position;
   upshift delaying means for delaying the timing of upshift using said frictional engaging element to be engaged by a predetermined time period when the temperature computed by said computing means is higher than said reference temperature and the target gear position is higher than the current gear position; and
   control means for when the target gear position is equal to or lower than the current gear position, maintaining the current gear position or allowing a downshift operation to be made in response to a request for downshift even if the temperature computed by the computing means is higher than the reference temperature.

2. The shift control device for the automatic transmission according to claim 1, wherein said upshift delaying means sets said predetermined time period so that the higher the temperature of said frictional engaging element to be engaged, the longer said predetermined time period.

3. The shift control device for the automatic transmission according to claim 1 further comprising delay canceling means for canceling the delay of the upshift timing by said predetermined time period by said upshift delaying means when the rotational speed of an engine becomes a set value or higher.

4. A shift control method for an automatic transmission having a plurality of frictional engaging elements adapted to be selectively engaged to perform shift control, said shift control method comprising the steps of:
   computing the temperature of at least one of said frictional engaging elements to be engaged in shifting;
   comparing the temperature computed by said computing with a reference temperature;
   comparing a target gear position with a current gear position;
   delaying the timing of upshift using said frictional engaging element to be engaged by a predetermined time period when the temperature computed by said computing is higher than said reference temperature and the target gear position is higher than the current gear position; and
   maintaining the current gear position or allowing a downshift operation to be made in response to a request for downshift even if the temperature computed by said computing is higher than the reference temperature, when the target gear position is equal to or lower than the current gear position.

5. The shift control method for the automatic transmission according to claim 4, wherein said delaying sets said predetermined time period so that the higher the temperature of said frictional engaging element to be engaged, the longer said predetermined time period.

6. The shift control method for the automatic transmission according to claim 4 further comprising the step of canceling the delay of the upshift timing by said predetermined time period by said delaying when the rotational speed of an engine becomes a set value or higher.

7. A non-transitory computer readable medium encoded with a program that causes a microcomputer to execute the shift control method for the automatic transmission according to claim 4.

* * * * *